US 6,625,694 B2

(12) United States Patent
Masri et al.

(10) Patent No.: US 6,625,694 B2
(45) Date of Patent: *Sep. 23, 2003

(54) SYSTEM AND METHOD FOR ALLOCATING A DIRECTORY ENTRY FOR USE IN MULTIPROCESSOR-NODE DATA PROCESSING SYSTEMS

(75) Inventors: Nabil N. Masri, Milpitas, CA (US); Wolf-Dietrich Weber, La Honda, CA (US)

(73) Assignee: Fujitsu Ltd., Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,432

(22) Filed: May 3, 1999

(65) Prior Publication Data

US 2002/0078304 A1 Jun. 20, 2002

Related U.S. Application Data

(60) Provisional application No. 60/084,795, filed on May 8, 1998.

(51) Int. Cl.[7] ............................................. G06F 12/12
(52) U.S. Cl. ...................... 711/133; 711/144; 711/159
(58) Field of Search ............................... 711/133, 134, 711/135, 136, 144, 159, 160, 207, 208, 124

(56) References Cited

U.S. PATENT DOCUMENTS

| | | | | |
|---|---|---|---|---|
| 5,265,232 A | * | 11/1993 | Gannon et al. | 711/124 |
| 5,377,345 A | * | 12/1994 | Chang et al. | 711/118 |
| 5,848,434 A | * | 12/1998 | Young et al. | 711/134 |
| 5,897,655 A | * | 4/1999 | Mallick | 711/134 |
| 5,933,849 A | * | 8/1999 | Srbljic et al. | 711/118 |
| 6,138,217 A | * | 10/2000 | Hamaguchi | 711/141 |
| 6,185,658 B1 | * | 2/2001 | Arimilli et al. | 711/133 |

OTHER PUBLICATIONS

U.S. patent application Ser. No. 09/287,650, Takeshi Shimizu, Credit–Based Protocol for Over–Run Protection in a Milti–Processor Computer System, filed Apr. 4, 1999.
U.S. patent application Ser. No. 09/041,568, Wolf–Dietrich Weber, Cache Coherence Unit for Interconnecting Multiprocessor Nodes Having Pipelined Snoopy Protocol, filed Mar. 12, 1998.
U.S. patent application Ser. No. 09/281,714, James Christopher Wilson, Split Sparse Directory for a Distributed Shared Memory Multiprocessor System, filed Mar. 30, 1999.
U.S. patent application Ser. No. 09/285,316, Wing Leong Poon, Computer Architecture for Avoiding Deadlock in Network Communications, filed Apr. 2, 1999.

* cited by examiner

Primary Examiner—Gary J Portka
(74) Attorney, Agent, or Firm—Carr & Ferrell LLP (57) ABSTRACT

An algorithm for selecting a directory entry in a multiprocessor-node system. In response to a memory request from a processor in a processor node, the algorithm finds an available entry to store information about the requested memory line. If at least one entry is available, then the algorithm uses one of the available entries. Otherwise, the algorithm searches for a "shared" entry. If at least one shared entry is available, then the algorithm uses one of the shared entries. Otherwise, the algorithm searches for a "dirty" entry. If at least one dirty entry is available, then the algorithm uses one of the dirty entries. In selecting a directory entry, the algorithm uses a "least-recently-used" (LRU) algorithm because an entry that was not recently used is more likely to be stale. Further, to improve system performance, the algorithm preferably uses a shared entry before using a dirty entry. In the preferred embodiment, the processor node that utilizes the invention includes at least one processor having a respective cache connected via a bus to main memory.

24 Claims, 7 Drawing Sheets

SYSTEM AND METHOD FOR ALLOCATING A DIRECTORY ENTRY FOR USE IN MULTIPROCESSOR-NODE DATA PROCESSING SYSTEMS

This application claims the benefit of U.S. provisional application No. 60/084,795, filed on May 8, 1998.

CROSS-REFERENCE TO CO-PENDING APPLICATIONS

This application is related to co-pending U.S. patent application Ser. No. 09/003,721, entitled "Cache Coherence Unit with Integrated Message Passing and Memory Protection for a Distributed, Shared Memory Multiprocessor System," filed on Jan. 7, 1998, now U.S. Pat. No. 6,209,064; co-pending U.S. patent application Ser. No. 09/003,771, entitled "Memory Protection Mechanism for a Distributed Shared Memory Multiprocessor with Integrated Message Passing Support," filed on Jan. 7, 1998, now U.S. Pat. No. 6,212,610; co-pending U.S. patent application Ser. No. 09/041,568, e titled "Cache Coherence Unit for Interconnecting Multiprocessor Nodes Having Pipelined Snoopy Protocol," filed on Mar. 12, 1998; co-pending U.S. patent application Ser. No. 09/281,714, entitled "Split Sparse Directory for a Distributed Shared Memory Multiprocessor System," filed on Mar. 30, 1999; co-pending U.S. patent application Ser. No. 09/285,316 entitled "Computer Architecture for Preventing Deadlock in Network Communications," filed on Apr. 2, 1999; and co-pending U.S. patent application Ser. No. 09/287,650 entitled "Credit-Based Message Protocol for Over-Run Protection in a Multi-Processor Computer System," file on Apr. 7, 1999, which are hereby incorporated by reference.

BACKGROUND OF THE INVENTION

1. Technical Field

The present invention relates generally to cache coherence in multiprocessor data processing systems, and more particularly to enhancing operation of caches with an algorithm for selecting a cache directory entry.

2. Discussion of the Background Art

A computer system node may be divided into a memory subsystem and a processor subsystem. The memory subsystem includes the main Dynamic Random Access Memory (DRAM) and provides data from memory in response to requests from any number of connected processors. Normally, the amount of time spent to access data in the memory subsystem is quite long relative to the processor's speed and therefore processors are often built with caches to improve their performance. The processor subsystem includes the processors and one or more caches. A cache is a small memory, connected between the processor and main memory, that stores recently-used data from the main memory. A cache is much faster to access than the main memory subsystem, and is usually much smaller. The smallest unit of data that can be transferred into and out of a cache is called a cached "line." The data in memory that corresponds to a cached line is called a memory line. A data line refers to either a cached line or a memory line.

All caching architectures divide main memory into physically consecutive segments comprising one or a series of memory lines, many of which correspond to a pluralities of cached lines. Accessing a cached line requires a segment tag to identify the segment that corresponds to the line and a line index to identify the line within the segment. Those skilled in the art will recognize that if a segment has only one line then a line index is not required. If a processor requests a data line that is already contained in the local cache, then that data line is delivered to the processor. Otherwise, the processor gets the data line from main memory.

Set-associative and fully associative caches are "multiple" ways, meaning a directory entry references multiple cached lines that have the same memory segment index but are from different segments. This, compared to a direct-mapped cache, can improve the cache-hit rate because the multiple-way directory reduces contention between active cache lines that map to the same way. Direct mapping of cache lines avoids the question of selecting a directory to replace when the directory is needed to reference a newly requested cached line, but fully-associative and set-associative cache mapping schemes require a replacement protocol to select a directory referencing a particular cached line that should be replaced. The most popular protocol is the Least Recently Used (LRU) protocol, which replaces the cache line that has not been used for the longest time.

Typically, a set-associative cache is four- to eight-way while a fully-associative cache is thirty-two- to sixty-four-way.

In a shared-memory multiprocessor system, each processor usually has its own cache, so the system has multiple caches. Since each cache can hold a copy of a given data line, it is important to keep the states of all different cached lines consistent and up-to-date with the latest version written by any one of the processors. A memory subsystem is usually responsible for returning, from the caches or main memory, the correct value as prescribed by the processor's memory model, which includes a cache-coherence protocol having a set of rules to govern the operation of caches.

To maintain cache coherence across the system, the cache-coherence protocol uses a directory that contains cache-coherence control information. The directory, usually part of the memory subsystem, has an entry for each main memory location with state information indicating whether the memory data may also exist in a cache elsewhere in the system. The coherence protocol specifies all transitions and transactions to be taken in response to a memory request. Any action taken on a cache line is reflected in the state stored in the directory. A common cache coherence scheme uses three permanent states to accomplish this:

Invalid: Line is not cached anywhere. Main memory has the only copy.

Shared: Line is valid in at least one cache at a remote node.

Dirty: Line is valid in one cache at a remote node. The copy may be modified by the processor in that remote node. The main memory may contain old data.

The coherence protocol may use other transient states to indicate that a line is in transition. Given enough time, these transient states revert to one of the above permanent states.

On every memory request from a processor, a memory subsystem must look at all cache tags to identify the segment that stores the memory line corresponding to the cached line. Each cache in a "snoopy protocol" can "snoop" every request and then signal to the memory subsystem if it has the most recent version of the cached line. Alternatively, the memory subsystem can keep a duplicate of each cache's tags to find the location of the most recent version of the cached line. A duplicate tag-based method is sometimes called a "directory based cache-coherence protocol."

Figure 1:
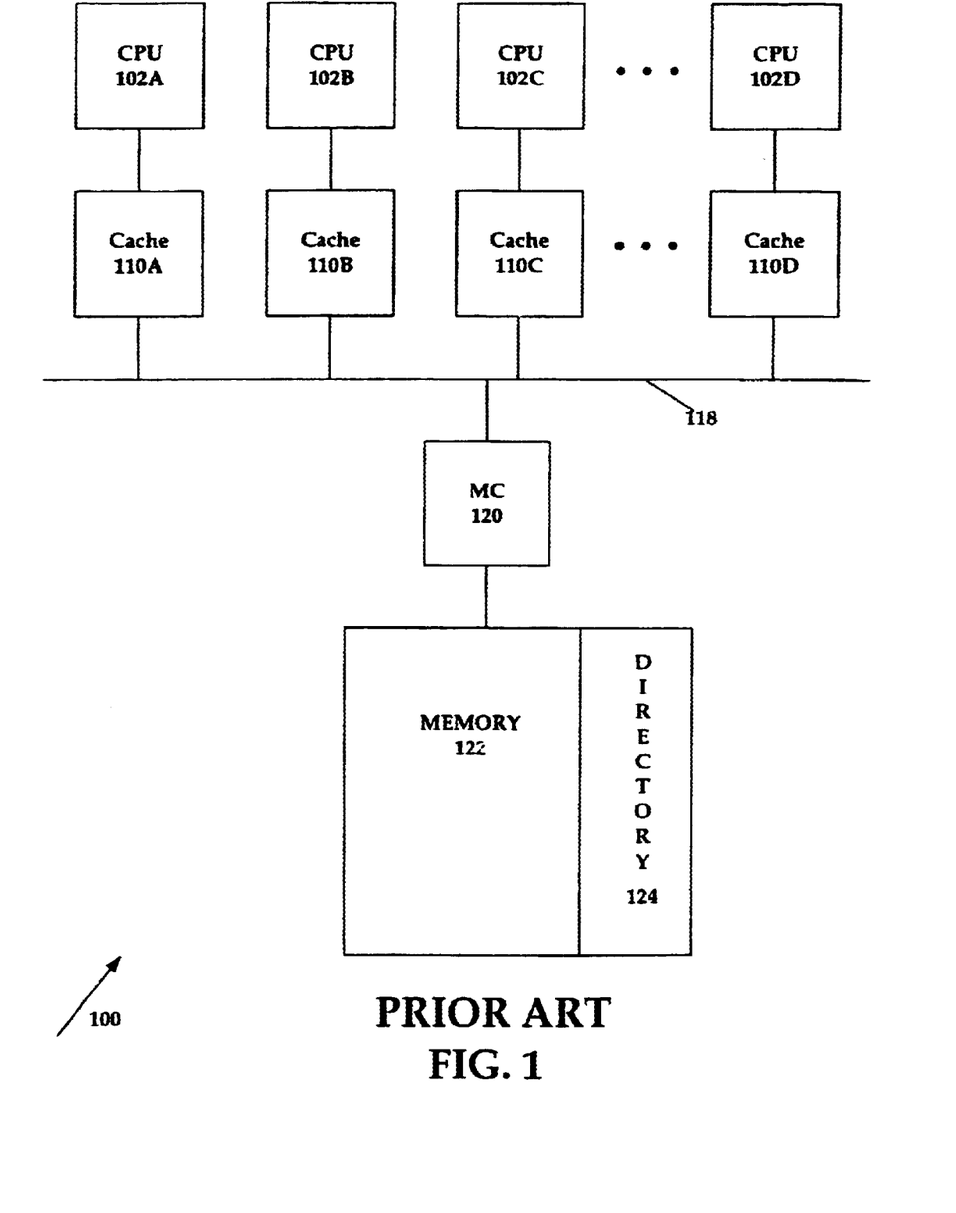
FIG. 1 shows a prior art system including multiple CPUs each having a local cache connected via a bus to main memory.

FIG. 1 shows a prior art system 100 including multiple CPUs 102A, 102B, 102C, and 102D having respective local caches 110A, 110B, 110C, and 110D connected by a bus 118 to a memory controller 120 for the main DRAM memory 122. In this example, main memory 122 has, for each memory line, a space reserved for a directory 124 entry, and therefore wastes memory spaces because the total number of cached lines, which determines the number of entries in directory 124, is usually much smaller than the total number of memory lines in memory 122. Further, the cache coherence protocols for prior art system 100 are deficient in that, as the number of caches 110 and size of memory 122 increase, the size of directory 124 becomes objectionably large.

System 100 may be improved by using a sparse directory, which is a cache of directory entries. However, a replacement algorithm to find a directory entry for referencing a new cached line without regard to the state of the existing cached line can cause heavy data traffic between memory 122 and caches 110, and thus degrade system performance.

Therefore, what is needed is a replacement algorithm for use in a sparse directory that can solve the above deficiencies.

SUMMARY OF THE INVENTION

The present invention provides an algorithm to allocate a directory entry to store the state of a cached line in response to a memory request from a processor. The algorithm thus searches the directory for an entry. If at least one free entry is available, then the algorithm uses one of the available entries. Otherwise, the algorithm searches for a "shared" entry, and if at least one shared entry is found, then the algorithm uses preferably a "least recently used" (LRU) criteria to search among the available shared entries. Otherwise, the algorithm searches for a "dirty" entry. If at least one dirty entry is found, then the algorithm uses preferably the LRU criteria to search among the available dirty entries. The algorithm uses an LRU criteria because entries that were allocated long ago and that have not been used recently are more likely to be stale. To increase system performance, the algorithm preferably searches for a shared entry before searching for a dirty entry.

These and other advantages of the invention will become apparent to those skilled in the art from the following detailed description and the accompanying drawings.

DESCRIPTION OF THE PREFERRED EMBODIMENT

Figure 2:
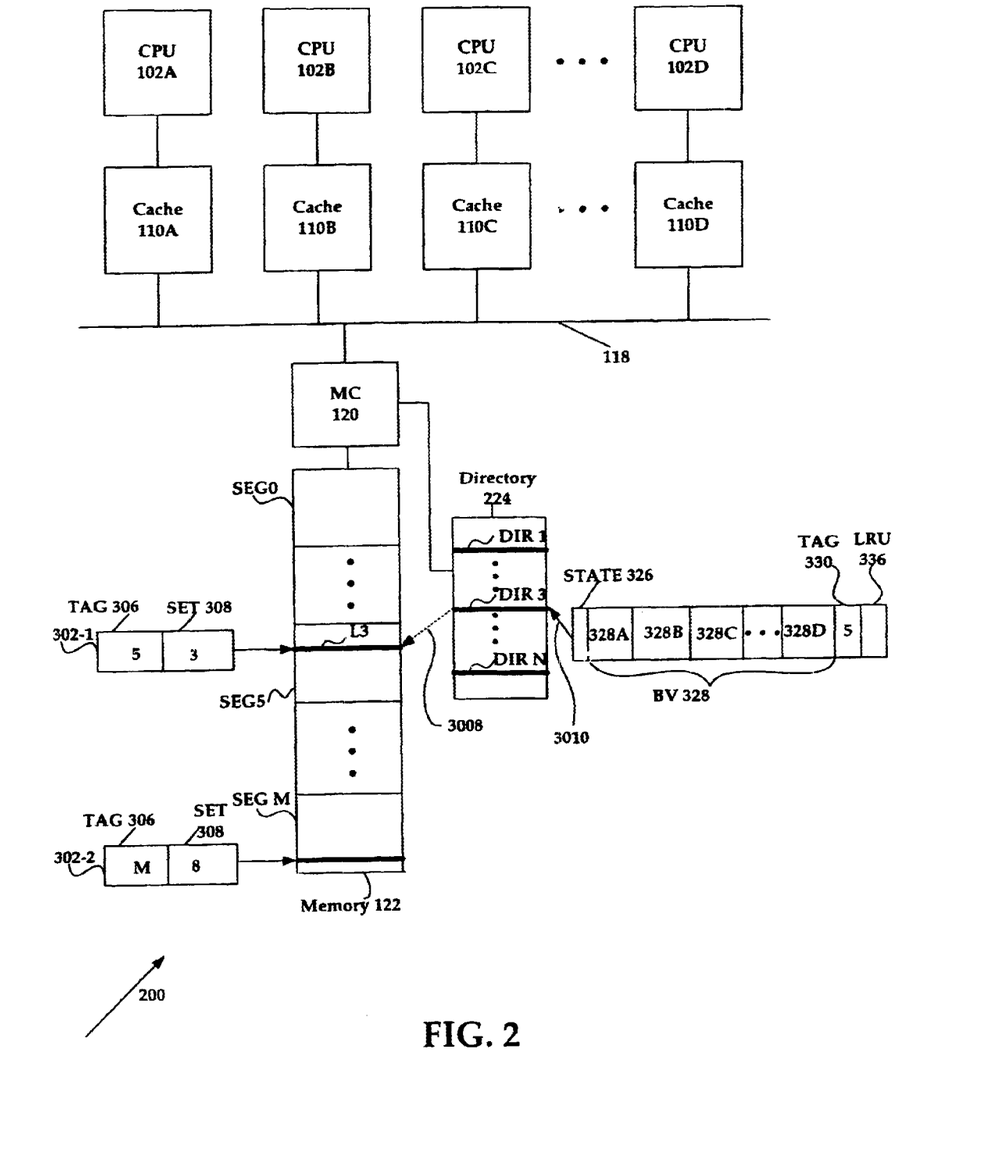
FIG. 2 shows a smaller and faster cache directory that utilizes the invention.

FIG. 2 is a block diagram showing a system 200 that utilizes the invention. System 200 is like system 100 except that system 200 includes a directory 224, which, instead of being part of memory 122, is connected to MC 120. Directory 224, usually referred to as a "sparse" directory, contains fewer directory entries than there are memory lines in memory 122, is smaller and faster than directory 124, and is typically in a Static Random Access Memory (SRAM) for higher speed.

Directory 224 includes a plurality of entries DIR 1 to DIR N. In a set-associative cache one DIR entry corresponds to one data line in each of the segment (SEG 0 to SEG M) of memory 122. Therefore, if a SEG has K data lines then directory 224 has K entries. Within a SEG a memory line is identified by an offset from the SEG base, and thus a "set" refers to all data lines that have the same offset but are stored in different SEGs. Consequently, DIR 1, for example, corresponds to set 1 that refers to all data lines having an offset 1 in all SEG 0 to SEG M. Similarly, DIR 2 corresponds to set 2 that refers to all data lines having an offset 2 in all SEG 0 to SEG M. In the example of FIG. 2, DIR 3 corresponds to line 3 (or offset 3 or set 3) of SEG 5 (and line 3 of other SEGs, which is not shown). Each DIR entry includes a "state information" field 326, a bit-vector (BV) field 328, a "tag" field 330, and, where appropriate, an LRU field 336. Arrow 3010 shows DIR 3 with its fields 326, 328, 330, and 336.

State information field 326 indicates the states of a cached line, which preferably include "invalid," "shared," "dirty," and "transient." An "invalid" state indicates a DIR is available and thus can be used; a "shared" state indicates a cached line is valid in at least one cache 110; a "dirty" state indicates a data line in memory 122 has been modified in one of the caches 110; and a "transient" state indicates the line is in transition between memory 122 and caches 110.

BV field 328 includes a plurality of sub-fields 328A, 328B, 328C, and 328D, each corresponding to a respective cache 110A, 110B, 110C, and 110D, to identify which caches 110 have a copy of a line from memory 122. For example, if the BV bit in field 328A is "1" (a logic high), then cache 110A has a copy of a data line of memory 122. Conversely, if the same BV bit in field 328A is a "0" (a logic low), then cache 110A does not have a copy of the memory 122 data line.

Tag field 330 identifies the memory segment corresponding to the cached line with which a DIR entry is associated. For example, if tag field 330 shows a value "5", then that DIR entry corresponds to a cached line corresponding to a memory line in segment 5 of memory 122, which is indicated by arrow 3008.

In a set-associative or fully-associative cache, directory 224 can be "multiple" ways, that is, one DIR entry can reference multiple cached lines. If so, a DIR entry includes an LRU field 336 that, based on a "Least Recently Used" (LRU) criteria, identifies which cached line is the least recently used by a processor. A value in an LRU field 336 is usually encoded, and evaluating this LRU field 336 in conjunction with the pre-defined values assigned during system design reveals the exact order of accesses of a DIR entry referencing a data line of memory 122.

If a DIR entry can map to, for example, two cached lines, then the directory 224 is referred to as a 2-way associative directory. Similarly, if a DIR entry can map to n cached lines, then the directory 224 is referred to as an n-way associative directory. In an embodiment relating to the invention, associative directories are usually four- to eight-ways.

Memory 122 includes multiple, usually up to millions of, segments, which are referred to as SEG 0, SEG 1, . . . , SEG M. Each SEG in a set-associative cache includes a series of memory lines, while each SEG in a fully-associative cache includes only one memory line. Within each SEG of a set-associative cache, a memory line is identified by a location offset. As discussed above, all lines having the same location offset within a SEG constitute a "set." A memory address 302 thus includes a tag portion 306 to identify which segment (SEG 0, SEG 1, SEG 2, etc.) of memory 122 the memory address 302 points to, and a set number portion 308 to determine the location offset of a line within a SEG that the address 302 points to. Thus, in FIG. 2 for example, address 302-1 points to a memory line in SEG 5 having an offset of (or set) 3. Similarly, address 302-2 points to a memory line in SEG M having an offset of 8.

Figure 3:
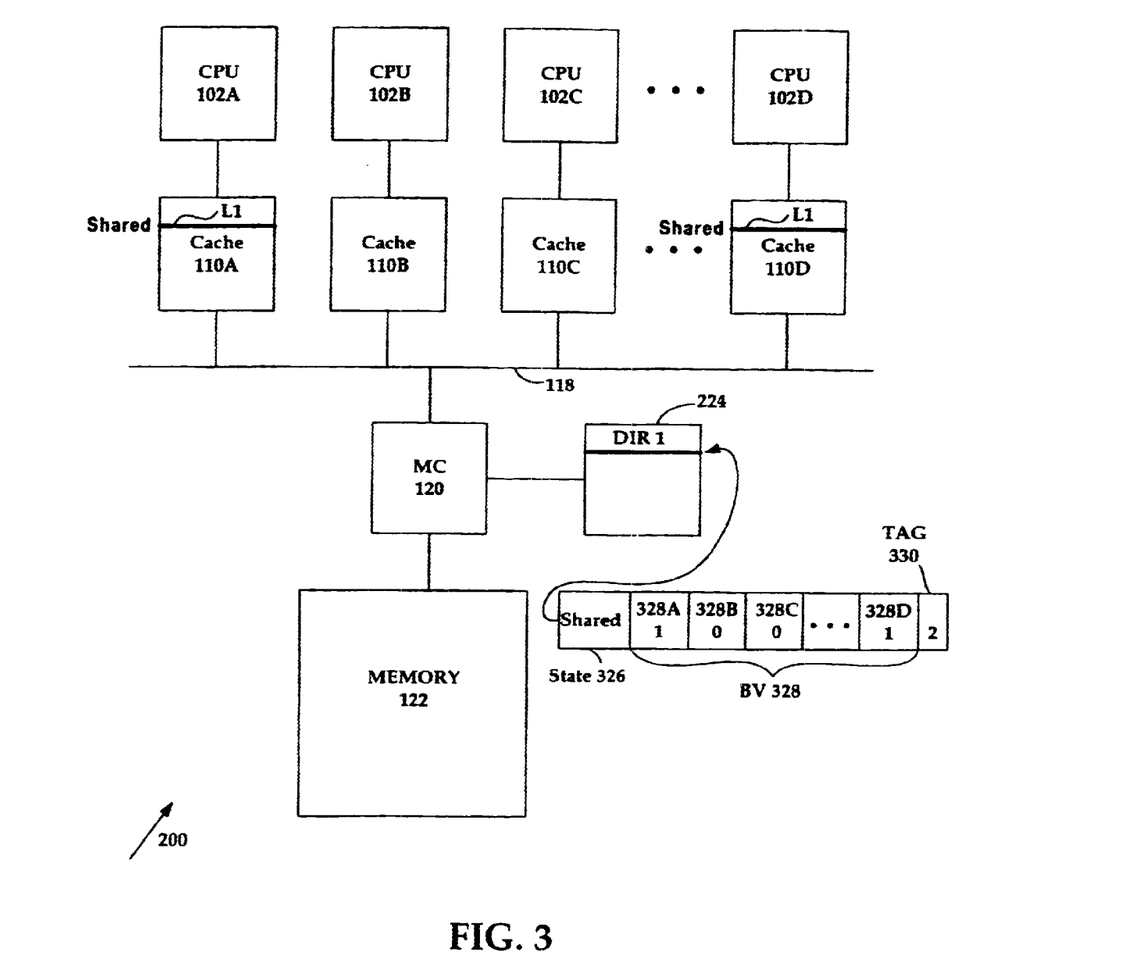
FIG. 3 shows an example of a memory line shared by two caches.

FIG. 3 shows an exemplary system 200 in which a cached line L1 represented by a DIR 1 is shared, for example, by two caches 110A and 110D. Consequently, state field 326 for line L1 is marked "shared," and two bits 328A and 328D in BV field 328 that correspond to caches 110A and 110D have "1" values.

Figure 4:
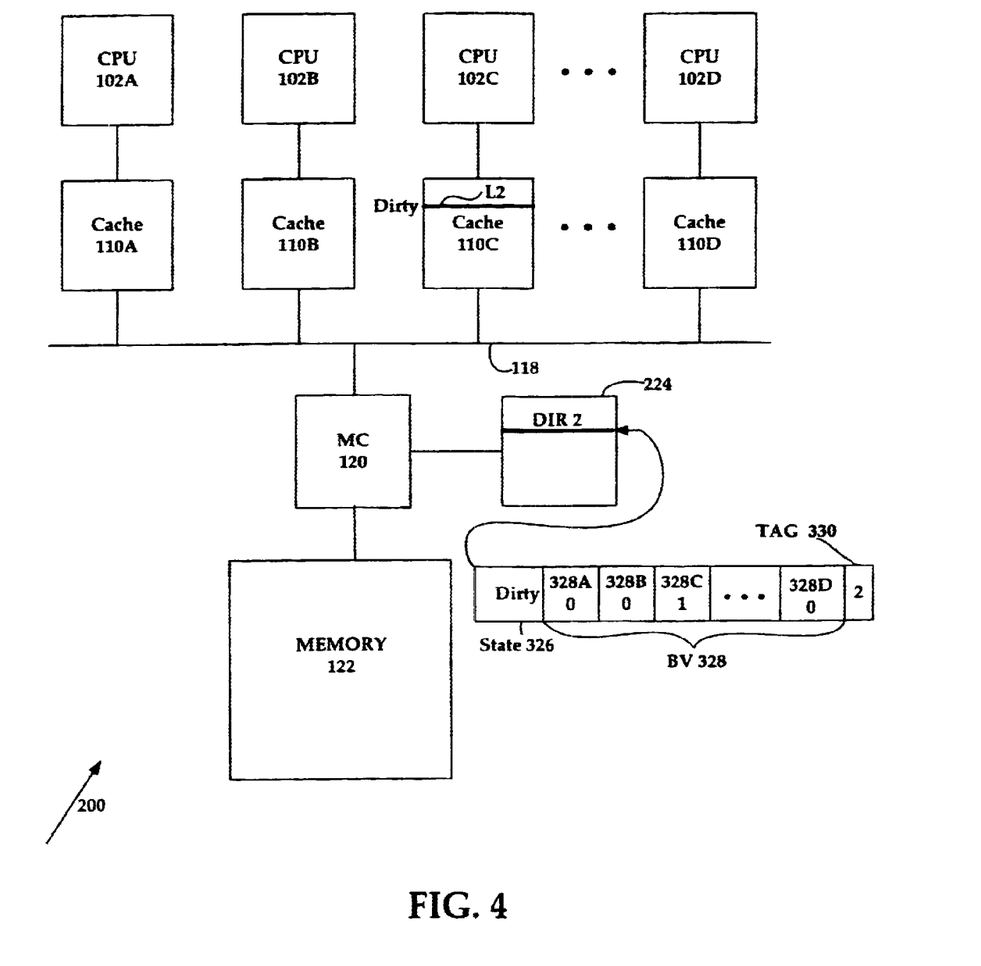
FIG. 4 shows an example of a modified cache including a "dirty" state information field.

FIG. 4 shows the same system 200 in which a cached line L2 represented by a DIR 2 has been modified in cache 110C. Accordingly, the state information field 326 for line L2 is marked "dirty," and the BV bit in field 328C, which corresponds to cache 110C, has a value "1."

In a preferred system 200, a valid cached line in a cache 110 should have a corresponding valid entry in directory 224. However, for various reasons, a cache 110 may replace its cached line without updating the corresponding directory 224 entry, which results in a "valid" directory entry without a corresponding valid cached line, or in other words a "stale" directory entry.

Figure 5:
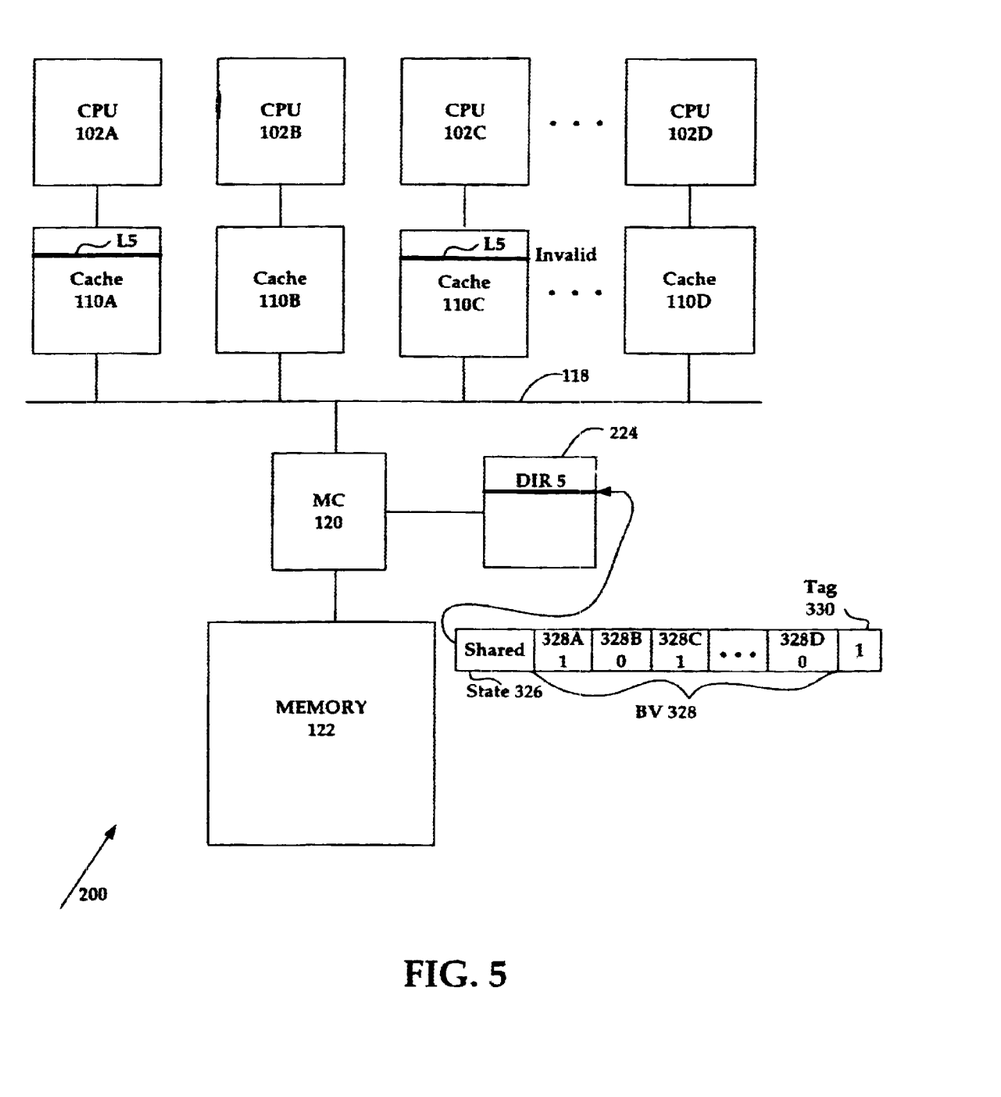
FIG. 5 shows a memory line that was shared by two processors and their respective caches, but later both caches invalidated their contents without updating the directory information.

FIG. 5 shows a system 200 having a stale directory entry. A cached line L5 represented by a DIR 5 is initially shared by two caches 110A and 110C. Therefore, state field 326 shows "shared," and the two bits 328A and 328C show "1's." However, because cache 110C later replaces its line L5 without updating DIR 5, line L5 of cache 110C is shown "invalid," and DIR 5 is "stale."

Figure 6:
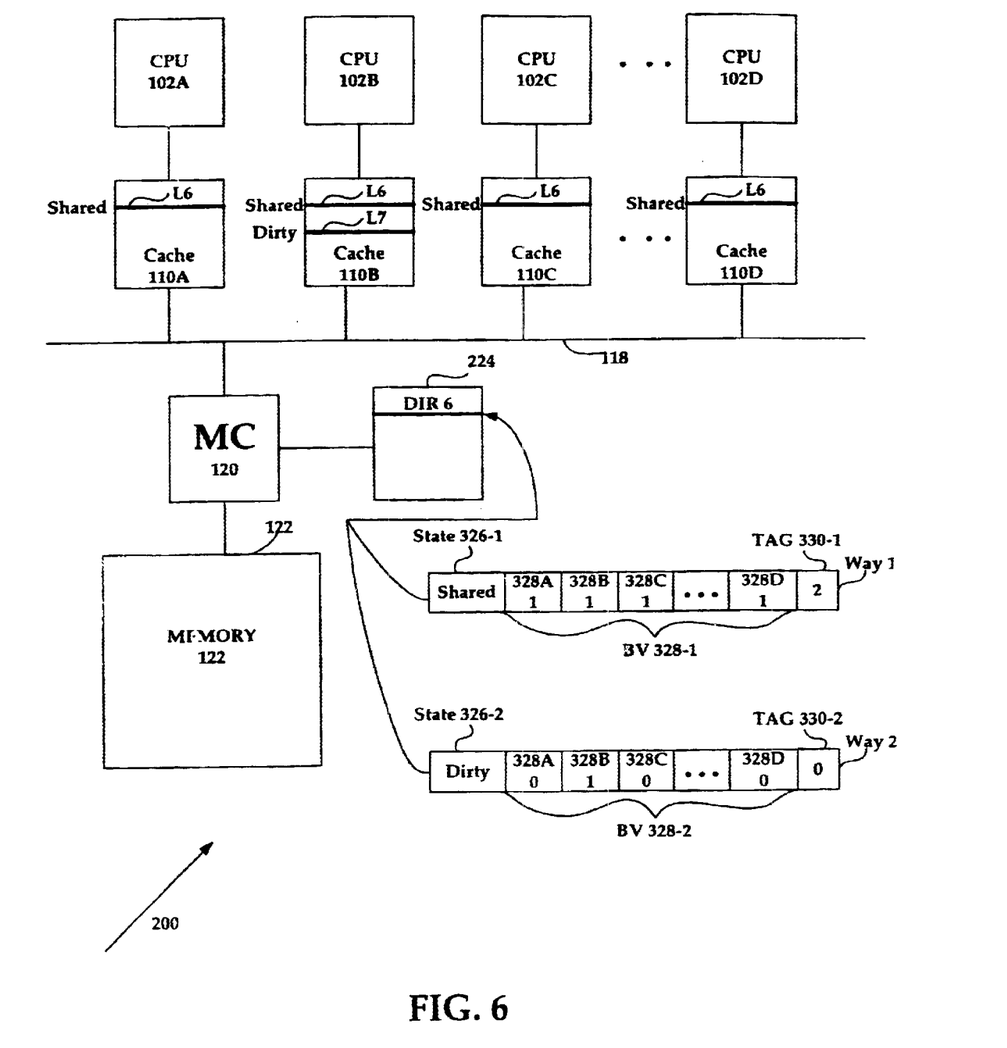
FIG. 6 shows a two-way set-associative directory entry.

FIG. 6 shows a system 200 having a two-way set-associative directory 224. A directory DIR 6 thus includes information for two cached lines, referred to as a "way 1" and a "way 2." In way 1, a cached line L6 in memory SEG 2 is shared by four caches 110A, 110B, 110C, and 110D, and therefore the state information field 326-1 for line L6 is marked a "shared"; BV bits 328A, 328B, 328C, and 328D corresponding to caches 110A, 110B, 110C, and 110D include "1" values; and the tag field 330-1 shows a "2" value. In way 2, a memory line L7 in SEG 0 has been modified by cache 110B. State field 326-2 of line L7 is thus marked "dirty," the bit in BV field 328B, corresponding to cache 110B, has a value "1," and the tag field 330-2 shows a SEG "0."

When a processor 102 requests a data line from memory 122, MC 120 allocates an entry in directory 224. If the directory 224 is full, then an old entry must be "evicted," that is, the entry will be selected to hold the directory information for the newly requested cached line.

Figure 7:
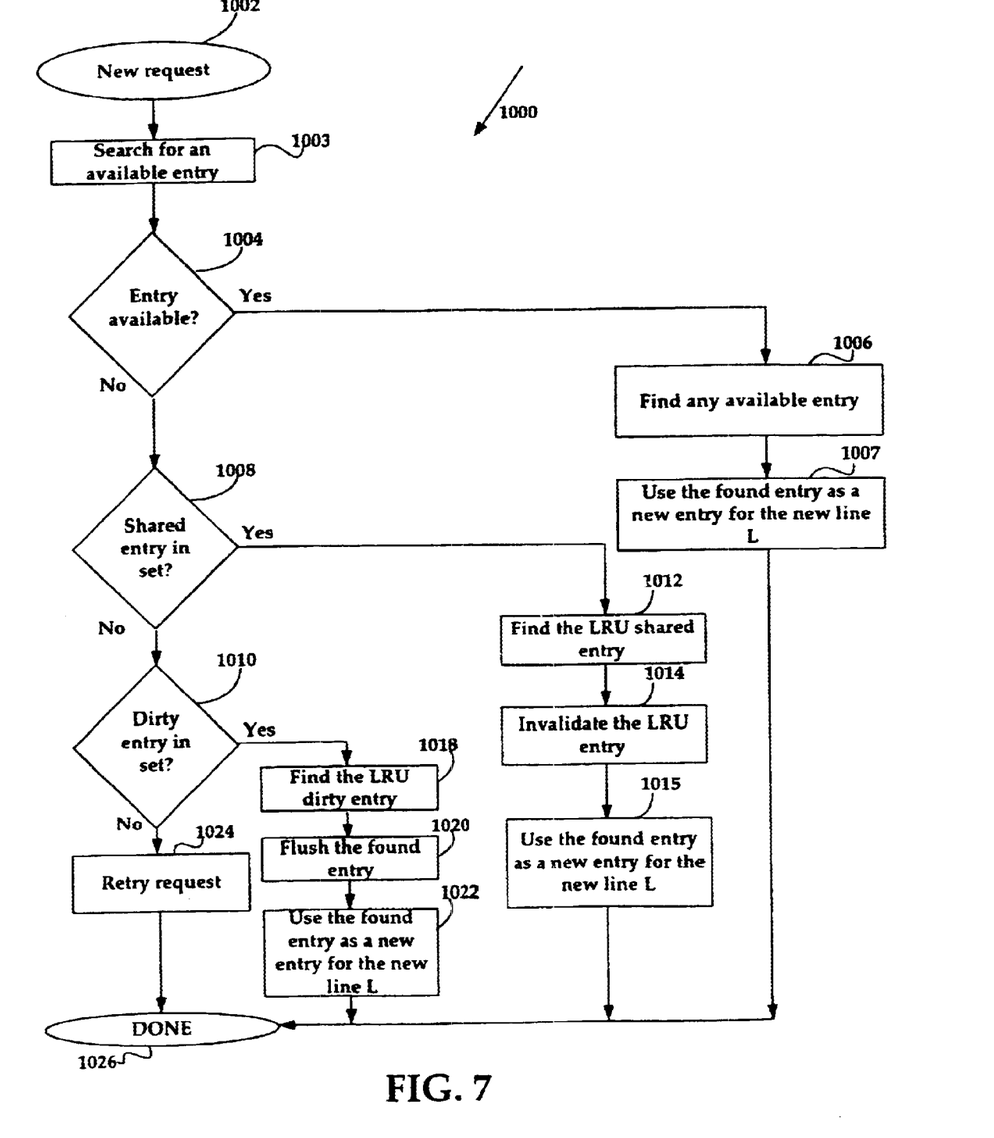
FIG. 7 is a flowchart of the replacement algorithm according to the invention.

The FIG. 7 flowchart illustrates a replacement algorithm which the invention uses to allocate a DIR entry for a new memory request. In step 1002 a processor 102 requests memory 122 to return a memory line L represented by a DIR entry. MC 120 in step 1003 searches directory 224 for an available entry, i.e., a DIR entry that includes a state field 326 marked "invalid." If in step 1004 MC 120 determines that a DIR entry is available, then in step 1006 MC 120 allocates any one available DIR entry for the newly requested line L. In step 1007 MC 120 uses the available DIR entry to reference the new line L. However, if in step 1004 MC 120 cannot find an available DIR entry, then in step 1008 MC 120 determines if at least one "shared" DIR entry (i.e., an entry having a state field 326 marked "shared") exists. If so, MC 120 in step 1012 uses an LRU criteria to find the least recently used (LRU) shared DIR entry, in step 1014 invalidates the found LRU shared DIR entry, and in step 1015 uses the invalidated DIR entry to reference the new line L.

If in step 1008 MC 120 cannot find a shared entry then in step 1010 MC 120 tests whether there is at least one DIR entry having a state field 326 marked "dirty". If so, then MC 120 in step 1018 uses the LRU criteria to find the LRU dirty DIR entry. MC 120 then in step 1020 flushes the found LRU dirty entry, that is, MC 120 invalidates the found entry and returns the data in the corresponding cached line to memory 122. In step 1022 MC 120 uses the found entry to reference the new line L.

If in step 1010 MC 120 cannot find a dirty DIR entry, then MC 120 asks processor 102 in step 1024 to retry requesting a memory line L at a later time. Not finding a dirty DIR entry in step 1010 indicates that cached lines represented by all DIR entries in directory 224 are currently in transition between memory 122 and caches 110. DIR entries representing transitional lines are excluded from replacement. In step 1026 the algorithm ends.

In the above algorithm, to reduce data traffic between memory 122 and caches 110, MC 120 searches for a shared DIR entry before searching for a dirty DIR entry to reference a new memory line. Using a shared DIR entry only requires invalidation of the corresponding memory line, while using a dirty DIR entry requires returning (or writing) the cached line to memory 122. Further, a shared DIR entry is more likely to be stale. Thus, the invention using this algorithm enhances system performance without incurring additional costs. The invention also simplifies the coherence protocol because the invention allows retrying the request for a new data line when all data lines represented by directory 224 are in transition between memory 122 and caches 110. Therefore, the invention is advantageous over prior solutions that use only the LRU algorithm to select a used DIR entry for a new memory line L, without regard to the state of the cached lines. The invention uses an LRU criteria to select a shared (step 1012) or a dirty (step 1018) DIR entry because a DIR entry that was not (or was the least) recently used is more likely to be stale than recently used entries. Invalidating a found entry in step 1014 or 1020 sends an invalidation message to all caches 110 that are associated with the invalidated cached line. The invention is also useful in all cache structures (L3, snoop filter tags, etc.) that attempt to maintain inclusion over other caches. Cache inclusion means that if a data line exists in one cache level of a multi-level cache system, then that line also exists in higher cache levels.

The present invention has been described with reference to a preferred embodiment. Other embodiments will be apparent to those skilled in the art in light of this disclosure. For example, the invention may readily be implemented using configurations other than those described. Additionally, the invention may effectively be used in combination with systems other than the one described. Therefore, these and other variations upon the preferred embodiment are within the scope of the present invention, which is limited only by the appended claims.

What is claimed is:

1. A data processing system comprising:

a main memory;

a plurality of processor each having a respective cache capable of storing a plurality of cached lines;

a memory controller; and a sparse directory, containing fewer memory lines than the main memory, for keeping track of states of the cached lines, each cache directory entry corresponding to data stored in the main memory;

wherein, upon a new request for a cache line, an algorithm uses said states of the cached lines stored in the sparse directory to allocate a cache directory entry for the requested cache line, and if the algorithm determines that all directory entries representing memory lines are in transitional states, then the algorithm retries the request.

2. The system of claim 1, wherein said algorithm will rank an entry having a "shared" state higher in preference for allocation than an entry having a "dirty" state.

3. The system of claim 2 wherein the algorithm allocates the least-recently-used entry from among the highest equally ranking entries.

4. The system of claim 1 wherein the algorithm uses a directory entry not currently in use.

5. The system of claim 1 wherein the algorithm chooses a directory entry representing a cached line that is valid in at least one of said processors.

6. The system of claim 1 wherein the algorithm chooses a directory entry representing a cached line that is dirty in one of said processors.

7. The system of claim 1 wherein said algorithm invalidates the cached line represented by said allocated cache directory entry.

8. The data processing system of claim 1, wherein there is only one type of dirty state for cache lines.

9. The data processing system of claim 1, wherein the states include a transient state and the algorithm does not choose a cache directory associated with the transient state.

10. The data processing system of claim 1, wherein shared states have a hierarchical level separate from other states.

11. The data processing system of claim 1, wherein each directory entry for each data line has a state information field for indicating the state of the data line, a bit vector field with one processor field for each processor, each processor field indicating whether it associated processor has a copy of the data line, and a tag field indicating a segment of the main memory with which the directory entry is associated.

12. The data processing system of claim 1 further comprising a main memory address entry including a tag portion identifying a segment of main memory and a set number portion used to determine the location offset of a line within the segment.

13. The data processing system of claim 1 wherein each cache directory entry maps to multiple cache lines.

14. The data processing system of claim 1, wherein a shared cache line may have a stale directory entry that was not updated.

15. The data processing system of claim 1, wherein the algorithm uses the directory to identify stale data that is no longer needed and can be discarded.

16. A method or selecting a directory entry among a plurality of directory entries having state information, comprising the steps of:

receiving a request to select from among said plurality of directory entries;

using said state information to select said directory entry; and allowing a re-request if it as been determined that all of said plurality of directory entries represent cached lines in transitional states.

17. A The method of claim 16 wherein the step of using further comprises the first ordered step of selecting an entry having an "invalid" state if such an entry exists.

18. The method of claim 17 wherein the step of using further comprises the second ordered step of selecting an entry having a "shared" state if such an entry exists.

19. The method of claim 18 wherein the second ordered step of selecting a shared entry uses a least-recently-used algorithm.

20. The method of claim 19 wherein the step of using further comprises the third ordered step of selecting an entry having a dirty state if such an entry exists.

21. The method of claim 20 wherein the third ordered step of selecting a dirty entry uses a least-recently-used algorithm.

22. The method of claim 21 further comprising the step of invalidating the cached line represented by said selected directory entry.

23. The method of claim 16, wherein there is only one type of dirty state for cache lines.

24. The method of claim 16, wherein shared states have a hierarchical level separate from other states.

* * * * *